3,384,642
NICOTINIC ACID ESTERS OF
1,3-PROPANE DIOLS
Michio Nakanishi, Ryosuke Kobayashi, and Katsuo Arimura, Nakatsu, Oita, Japan, assignors to Hoshitomi Pharmaceutical Industries, Ltd., Osaka, Japan
No Drawing. Filed Nov. 16, 1965, Ser. No. 508,140
Claims priority, application Japan, Nov. 18, 1964, 39/65,178; Oct. 12, 1965, 40/62,859
9 Claims. (Cl. 260—295.5)

ABSTRACT OF THE DISCLOSURE

Compounds of the formula

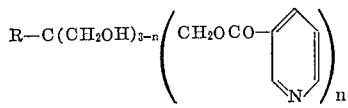

wherein R is alkyl of 5 to 20 carbon atoms and $n$ is an integer from 1 to 3, are useful in the treatment of hypercholesteremia and peripheral vascular diseases, are well absorbed and show prolonged activity without producing significant or substantial side effects, such as flushing, skin sensation, formication and hyperemic skin reaction.

This invention relates to novel esters of nicotinic acid and a method for preparing the same.

The novel esters of nicotinic acid of this invention are represented by the formula

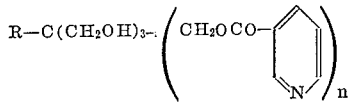

where R is an alkyl group of 5 to 20 carbon atoms and $n$ is a whole number of 1 to 3.

The alkyl group represented by R in the Formula I may be either a straight or a branched alkyl of 5 to 20 carbon atoms, such as pentyl, hexyl, isohexyl, heptyl, isoheptyl, octyl, nonyl, decyl, undecyl, dodecyl, isododecyl, tridecyl, tetradecyl, pentadecyl, hexadecyl, heptadecyl, octadecyl, nonadecyl or eicosyl.

Nicotinic acid and some of its esters have been used externally or internally as peripheral vasodilating agents or as cholesterol lowering agents. However, their action is transient and they very often produce, at the therapeutic dosage levels, various side effects, such as flushing, skin sensation, formication and hyperemic skin reaction.

It has been found that the compounds of Formula I, when administered orally, are well absorbed and show prolonged activity, without producing significant or substantial side effects mentioned above. Moreover, the compounds of the Formula I have a low order of toxicity and almost no taste or odor.

The compounds of this invention can be prepared by esterifying a compound of the formula $$R—C(CH_2OH)_3 \quad [II]$$

where R is an alkyl group of 5 to 20 carbon atoms, with nicotinic acid or a conventional functional derivative thereof, such as nicotinoyl chloride, nicotinic anhydride or lower alkyl nicotinate.

The reaction is preferably carried out in a solvent such, for example, as acetone, acetonitrile, dioxane, tetrahydrofuran, benzene, toluene, xylene, ether, etc.

The reaction is preferably carried out in the presence or in the absence of an organic or inorganic base, such as a tertiary amine—e.g. triethylamine, diethylaniline, pyridine—and an alkali metal salt—e.g. sodium hydrogen carbonate, sodium carbonate and potassium carbonate. When such an organic base is employed, it may also serve as a solvent.

The reaction can be accelerated, when desired, by heating.

For example, the compounds of the invention are advantageously prepared by reacting a compound of Formula II with nicotinic acid in the presence of a sulfonyl halide, such as methanesulfonyl chloride or p-toluenesulfonyl chloride, thionyl chloride, chlorosulfonic acid, phosphorus oxychloride, phosphorus trichloride or phosphorus pentachloride, together with the said tertiary amine, heating, for example, to 100–150° C. being usually carried out after mixing the reactants.

The compounds of this invention are also advantageously prepared by reacting a compound of the Formula II with nicotinic anhydride or nicotinoyl halide, especially nicotinoyl chloride, in the presence of the said organic or inorganic base together with polar solvent, such as acetone, acetonitrile, dioxane or tetrahydrofuran.

The compounds of this invention are also advantageously prepared by reacting a compound of Formula II with a lower alkyl nicotinate (alkyl having 1 to 5 carbon atoms) in the presence of a catalyst, such as an alkali alkoxide under heating.

In these reactions, by controlling the mole ratio of the compound of the Formula II to nicotinic acid or its functional derivative, the desired mono-, di- or tri-nicotinate of the compound of the Formula II can be obtained. The mono- or di-nicotinate can be further esterified to di- or tri-nicotinate respectively.

Thus the following compounds, for example, are prepared:

2-(hydroxymethyl)-2-pentyl-1,3-propanediol trinicotinate,
2-hexyl-2-(hydroxymethyl)-1,3-propanediol trinicotinate,
2-hexyl-2-(hydroxymethyl)-1,3-propanediol mononicotinate,
2-(hydroxymethyl)-2-hexyl-1,3-propanediol trinicotinate,
2-(hydroxymethyl)-2-hexyl-1,3-propanediol dinicotinate,
2-(2-ethylhexyl)-2-(hydroxymethyl)-1,3-propanediol trinicotinate,
2-decyl-2-(hydroxymethyl)-1,3-propanediol trinicotinate,
2-decyl-2-(hydroxymethyl)-1,3-propanediol dinicotinate,
2-(hydroxymethyl)-2-tridecyl-1,3-propanediol trinicotinate,
2-hexadecyl-2-(hydroxymethyl)-1,3-propanediol trinicotinate and
2-eicosyl-2-(hydroxymethyl)-1,3-propanediol trinicotinate.

The toxicity of the compounds of this invention is low. For example, in a toxicity study, when 6 grams per kilogram dose of 2-(hydroxymethyl)-2-hexyl-1,3-propanediol trinicotinate was administered orally to mice, all of the animals survived.

In the usual doses of the compounds of the invention, the aforesaid side effects occur infrequently. For example, when 200 milligrams of 2-(hydroxymethyl)-2-octyl-1,3-propanediol trinicotinate were administered respectively to those who had complained of flushing, formication, etc. at 30 milligrams dose of nicotinic acid, none complained of any side effects.

The compounds of this invention are well absorbed after oral administration and their vasodilating and cholesterol lowering effects last for a long period of time.

The vasodilating effect of 2-(hydroxymethyl)-2-octyl-1,3-propanediol trinicotinate, for example, is 200 to 600 times as strong as that of nicotinic acid.

Presently preferred typical embodiments of the invention are as follows:

EXAMPLE 1

To a solution of 3.5 grams of 2-(hydroxymethyl)-2-pentyl-1,3-propanediol in 50 milliliters of pyridine was added dropwise 12.5 grams of nicotinoyl chloride at 40° C. with stirring. The mixture was heated on a water bath for 0.5 hour. After cooling, the mixture was poured into 200 milliliters of ice water, and extracted with benzene. The benzene layer was washed in sequence with water, aqueous sodium carbonate and water, dried over potassium carbonate, decolorized with activated charcoal, and then the benzene was distilled off. The resultant pale yellow viscous oily residue, after washing with hexane and allowing to stand in a cool place, solidified into waxy solid, which was crushed, washed with a mixture of hexane and isopropyl ether and dried in a cool place to give 6.5 grams of 2-(hydroxymethyl)-2-pentyl-1,3-propanediol trinicotinate, melting at 46° C. The yield was 66.3%.

EXAMPLES 2–4

In 50 milliliters of pyridine were dissolved 50 grams of nicotinic acid and 50 grams of p-toluenesulfonyl chloride. While stirring, the mixture gradually became hot and colorless, and finally solidified. To the mixture was added dropwise a solution of 19 grams of 2-hexyl-2-(hydroxymethyl)-1,3-propanediol in 400 milliliters of pyridine at a temperature below 80° C. The mixture was heated at 115–125° C. on an oil bath for one hour. After cooling, the mixture was poured into 300 milliliters of ice water, and extracted with toluene. The toluene layer was washed in sequence with water, aqueous sodium carbonate and water, dried over potassium carbonate, and then the toluene was distilled off. The oily residue was crystallized from ethanol to give 30 grams of 2-hexyl-2-(hydroxymethyl)-1,3-propanediol trinicotinate, melting at 94–96° C. The yield was 59.5%.

Similarly prepared were:

2-decyl-2-(hydroxymethyl)-1,3-propanediol trinicotinate, melting at 52–54° C. (recrystallized from isopropyl ether) with the yield of 66.9%, and 2-hexadecyl-2-(hydroxymethyl)-1,3-propanediol trinicotinate, melting at 16–18° C. (recrystallized from hexane) with the yield of 70.5%.

EXAMPLE 5

To a suspension of 62 grams of nicotinoyl chloride and 35 grams of sodium carbonate was added dropwise a solution of 10.9 grams of 2-(hydroxymethyl)-2-octyl-1,3-propanediol in 50 milliliters of acetonitrile at 40° C. with stirring. The mixture was refluxed for one hour. Then the acetonitrile was distilled off, and the residue was extracted with benzene. The benzene layer was washed in sequence with water, aqueous sodium carbonate and water, dried over potassium carbonate, and the benzene then distilled off. The resultant oily residue, when suspended in hexane and allowed to stand in a cool place, solidified. The solid was recrystallized from a mixture of hexane and ethanol to give as fine powder 18 grams of 2-(hydroxymethyl)-2-octyl-1,3-propanediol trinicotinate, melting at 58–59° C. The yield was 67.8%.

EXAMPLE 6

An intimate mixture of 19 grams of 2-hexyl-2-(hydroxymethyl)-1,3-propanediol and 20 grams of hydrochloride of nicotinoyl chloride was heated at 100° C. for one hour. After cooling, the mixture was extracted with water, the aqueous layer was made alkaline with aqueous ammonia, the separated oil was extracted with isopropyl ether, the extract was dried over potassium carbonate, and the solvent was distilled off to leave pale yellow viscous oil, which was dissolved in isopropyl ether and allowed to stand in a cool place to precipitate as white crystals 2-hexyl-2-(hydroxymethyl)-1,3-propanediol mononicotinate, melting at 71–73° C. The yield was 22.5 grams (76.3%).

*Elementary analysis.*—Calculated for $C_{16}H_{25}NO_4$: C, 65.06%; H, 8.53%; N, 4.74%. Found: C, 65.32%; H, 8.48%; N, 4.65%.

The compounds of the invention are administered orally as tablets or powder for the treatment of hypercholesteremia or peripheral vascular diseases, such as Burger's disease, acrocyanosis and chilblains. The usual dosage for adults is, for example, 600 to 1200 milligrams per day.

What is claimed is:

1. A compound of the formula

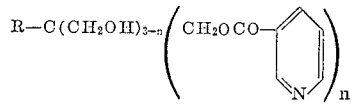

wherein R is alkyl of 5 to 20 carbon atoms, and $n$ is a whole number of 1 to 3.

2. A compound as claimed in claim 1, wherein $n$ is 3.

3. A compound as claimed in claim 1, wherein $n$ is 1.

4. A compound as claimed in claim 1, the said compound being the 2-(hydroxymethyl)-2-pentyl-1,3-propanediol trinicotinate.

5. A compound as claimed in claim 1, the said compound being the 2-hexyl-2-(hydroxymethyl)-1,3-propanediol trinicotinate.

6. A compound as claimed in claim 1, the said compound being the 2-(hydroxymethyl)-2-octyl-1,3-propanediol trinicotinate.

7. A compound as claimed in claim 1, the said compound being the 2-decyl-2-(hydroxymethyl)-1,3-propanediol trinicotinate.

8. A compound as claimed in claim 1, the said compound being the 2-hexadecyl-2-(hydroxymethyl)-1,3-propanediol trinicotinate.

9. A compound as claimed in claim 1, the said compound being the 2-hexyl-2-(hydroxymethyl)-1,3-propanediol mononicotinate.

References Cited

UNITED STATES PATENTS 2,863,873  12/1958  Thuresson et al. ____ 260—295.5

FOREIGN PATENTS 904,780  8/1962  Great Britain.

OTHER REFERENCES

Dell' Omodarme et al., Chem. Abstracts, vol. 56, par. 12255 (1962).

Di Paco et al., Chem. Abstracts, vol. 59, par. 4027 and 4028 (1963).

Seckfort et al., Chem. Abstracts, vol. 54, par. 25270 (1960).

Holmes et al., J. Am. Oil Chem. Soc., vol. 42, No. 10, October 1965, pp. 833–5.

JOHN B. RANDOLPH, *Primary Examiner.*

WALTER A. MODANCE, *Examiner.*

A. L. ROTMAN, *Assistant Examiner.*

UNITED STATES PATENT OFFICE
CERTIFICATE OF CORRECTION

Patent No. 3,384,642                                                         May 21, 1968

Michio Nakanishi et al.

It is certified that error appears in the above identified patent and that said Letters Patent are hereby corrected as shown below:

In the heading to the printed specification, line 5, "Hoshitomi" should read -- Yoshitomi --.

Signed and sealed this 2nd day of December 1969.

SEAL)

Attest:

Edward M. Fletcher, Jr.                                    WILLIAM E. SCHUYLER, JR.

Attesting Officer                                                     Commissioner of Patents